United States Patent [19]
Argenio

[11] 3,891,581

[45] June 24, 1975

[54] WATER DILUTABLE TRANSFER INK COMPOSITIONS

[76] Inventor: Domenic Argenio, 5 Briarwood Ct., West Paterson, N.J. 07424

[22] Filed: Mar. 21, 1973

[21] Appl. No.: 343,361

[52] U.S. Cl. ........................ 260/16; 8/2.5; 106/22; 106/26; 106/30; 117/3.4; 260/26
[51] Int. Cl.$^2$... B41M 3/12; C08L 1/26; D06P 1/44; C08L 93/04
[58] Field of Search ...................... 260/16, 26; 8/2.5; 106/22–23, 26–30; 117/3.4

[56] References Cited
FOREIGN PATENTS OR APPLICATIONS
1,211,149  11/1970  United Kingdom...................... 8/2.5

*Primary Examiner*—Melvin Goldstein
*Assistant Examiner*—Edward Woodberry
*Attorney, Agent, or Firm*—Raymond P. Niro

[57] ABSTRACT

Water dilutable transfer ink compositions are provided for use in flexographic and rotogravure heat transfer printing processes. Such ink compositions can include disperse dyes capable of subliming upon the application of heat, a thermoplastic resin, a water or alkali-water soluble polymer, a surface active agent, an organic amine, ammonium hydroxide, a water-miscible solvent and water.

6 Claims, No Drawings

WATER DILUTABLE TRANSFER INK COMPOSITIONS

BACKGROUND OF THE INVENTION

This invention relates generally to water dilutable transfer ink compositions and more specifically water dilutable transfer ink compositions useful in the heat transfer printing of textile fabrics and the like.

In recent times, new processes have been developed for printing textile fabrics such as polyester, acrylic and nylon fabrics, which are commonly known in the art as heat transfer or thermal printing processes. In heat transfer printing, a paper substrate is generally first printed with a desired pattern using ink compositions, and then the pattern is transferred from the printed paper to a textile fabric by the application of heat and sufficient pressure to insure intimate contact between the paper and fabric. Generally in such processes, the vehicle of the ink does not itself transfer to the fabric, but rather, the coloring of the fabric is accomplished by sublimation of the dye portion of the ink composition. Typically, transfer temperatures of approximately 400°F are high enough to cause the dye to sublime from the ink image on the paper and to effect transfer and printing of the particular pattern on the fabric to be printed.

Although a number of solvent-based ink compositions have been used in heat transfer processes, such as flexographic and rotogravure printing processes, none has proven to be entirely satisfactory. Solvent-based inks are more difficult to clean from printing equipment, are sometimes not suitable for use with conventional printing equipment, and are flammable and thus more hazardous than water-based inks, and in some cases, cause significant pollution problems. In addition, such solvent based inks sometimes stick to the fabric being printed, and thus are not entirely suitable for this further reason.

Pigment-containing ink compositions are likewise not suitable for use in heat transfer processes because the pigments do not sublime under the heat transfer temperatures and, in addition, have a tendency to stick to the transfer paper. Such pigments, moreover, are sometimes not fully compatible with a wide range of textile fabrics, and thus, are not entirely suitable for use in heat transfer ink compositions.

A significant need has developed, therefore, for water-based heat transfer ink compositions that are inexpensive, easily cleaned, non-flammable, compatible with a wide range of textile fabrics, and yet are fully usable in heat transfer printing processes.

SUMMARY OF THE INVENTION

According to this invention, water-dilutable transfer ink compositions are provided for use in heat transfer printing processes used to print textile fabrics. The water-dilutable transfer ink compositions of this invention include: one or more dispersed dyes capable of sublimation at temperatures in the range of about 375°F to 425°F, a thermoplastic resin, a water or alkali-water soluble polymer, water and various other components such as surface active agents, organic amines, water-miscible solvents, and/or ammonium hydroxide.

Generally, the solvent composition of such waterdilutable transfer ink compositions is about 20 to 100 percent water, and the ink compositions are typically able to accept a water dilution of at least 50 percent without impairing the printing properties thereof.

DESCRIPTION OF THE EMBODIMENTS

The transfer ink compositions of this invention employ a unique class of disperse dyes, in place of conventional pigments which are commonly used in most ink compositions. The disperse dyes useful in the practice of this invention have subliming characteristics sufficient to permit the dyes to sublime upon application of heat and pressure in a heat transfer printing process. Since temperatures in the range of 375°F to 425°F are commonly employed in heat transfer printing processes, it is desirable to select disperse dyes in the practice of this invention that sublime at temperatures in the range of about 375°F to 425°F. It should be understood, of course, that dyes capable of subliming at lower or higher temperatures, or even under vacuum conditions are also useful in the practice of this invention, the controlling condition simply being the ability of the dye to sublime under the specific temperature and pressure conditions employed in any given heat transfer printing process.

Although a number of such disperse dyes can be used in the practice of this invention, the following list of disperse dyes are illustrative of the type dyes used in the ink transfer compositions. The specific dyes listed below can be identified by their reference in the Five Volume Colour Index — Published by the Society of Colourists and Chemists in England (Association Of Textile Chemists and Colourists, November, 1971).

| Disperse | Yellow | 33 |
| Disperse | Yellow | 54 |
| Disperse | Orange | 25 |
| Disperse | Red | 78 |
| Disperse | Red | 60 |
| Disperse | Blue | 64 |
| Disperse | Blue | 55 |
| Disperse | Violet | 18 |

In addition to the disperse dye component of the transfer ink compositions of this invention, typical formulations also include: (1) a thermoplastic resin, (2) a water or alkali-water soluble polymer having a relatively high melting point and film forming properties, (3) a surface active agent, (4) an organic amine, (5) a water-miscible solvent, (6) ammonium hydroxide and (7) water.

Typical thermoplastic resins useful in the practice of this invention include thermoplastic resins made by reacting a polyol partially esterified rosin with maleic anhydride, fumaric acid or a combination of these dibasic acids. Typical acid numbers of such resins are between 75 and 300 and melting points between 90° and 190°C.

Included among the water or alkali-water soluble polymers useful in the practice of this invention are certain cellulosic polymers such as methyl cellulose, sodium carboxymethylcellulose, carboxymethyl hydroxyethyl cellulose, and hydroxypropyl cellulose, or certain proteins, such as alpha, beta or delta protein, or casein.

Various surface active agents, either nonionic or anionic in nature, can also be used in the transfer ink compositions of this invention, including polyoxyethylene adducts, mono and diglycerides, sorbitan fatty esters, polyoxyethylene sorbitan fatty acid esters and sodium lauryl sulfate or oleate.

As noted above, various alkaline components such as ammonium hydroxide or organic amines can also be included in the ink compositions of this invention. When ammonium hydroxide is included in ink formulation, generally 28° Baume ammonium hydroxide is used. Typical organic amines used in this invention are lower alkyl amines, such as methyl amine, dimethyl amine, trimethyl amine, ethyl amine, triethyl amine and the like. The use of such alkaline components, of course, makes the resultant ink composition formulation basic. Typically, for example, the pH of the resultant compositions is in the range of about 8 to 9.

The remaining components of the transfer ink compositions of this invention are water, which serves as the basic solvent for the composition, and, in some cases, volatile water-miscible organic solvents including lower aliphatic alcohols, such as methyl alcohol, ethyl alcohol, and normal propyl alcohol, and the lower alkylene glycols and their esters and ethers such as ethylene glycol, diethylene glycol mono ethyl ether and ethylene glycol mono ethyl ether.

The use of water as the major solvent component of the transfer ink compositions of this invention results in significant advantages. For example, the ink compositions of this invention can be readily cleaned from printing equipment with tap water. Moreover, the use of water as the major solvent component makes the ink compositions less expensive and less hazardous than conventional solvent-based systems. Surprisingly, however, the use of water as the major solvent component allows the resultant ink compositions to be diluted with water to at least 50 percent without harming the printing properties of the ink compositions. Moreover, it has heretofore been felt that water-based ink compositions could not be effectively used in heat transfer printing processes, and thus, it is quite unexpected that ink compositions, such as those disclosed herein, using water to make up about 20 percent to 100 percent of the total solvent component, can, in fact, be successfully used for heat transfer printing.

The relative quantities of the various components described above can be varied considerably, depending upon the specific use or application for the resultant transfer ink composition. Generally, however, it has been found that the following ranges of the various components (given in percentage by weight) are desirable: 1 to 35 percent disperse dye; 5 to 40 percent thermoplastic resin; 1 to 10 percent water or alkali-water soluble polymer; 1 to 10 percent surface active agent; 0.5 to 5 percent organic amine; 0.5 to 5 percent ammonium hydroxide; 0 to 50 percent water-miscible solvent and 5 to 60 percent water.

Naturally, it should be noted that the actual percentages of any given component of the resultant transfer ink formulation can change. For example, when large quantities of water are used, e.g., 40 to 60 percent, relatively small amounts of the water-miscible solvent, e.g., 5 to 15 percent, are used. It is especially desirable, for example, as indicated by the following example, to use about 45 to 55 percent water and 10 percent or less water-miscible solvent in the ink compositions.

The following example, in which the percentages are given by weight, serves to illustrate a typical formulation for the transfer ink compositions of this invention:

EXAMPLE

| Percent of Total | Component |
|---|---|
| 15.0 | Disperse Yellow 23 Dye |
| 02.5 | Surface Active Agent |
| 25.0 | Tap Water |

The disperse yellow 23 dye is mixed with water and a surface active agent and the mixture is ground in a pebble mill. The following components are then added to the above mixture to form ink compositions suitable for use as in a heat transfer printing process.

| Percent of Total | Component |
|---|---|
| 02.0 | Amine |
| 03.0 | Ammonium Hydroxide 28° Baume |
| 10.0 | Maleic Resin |
| 06.5 | Protein |
| 10.0 | Ethyl Alcohol (Denatured) |
| 26.0 | Tap Water |

Total Ink Composition = 100 percent

The ink composition prepared in accordance with the above outlined procedure can be used directly in a heat transfer printing process or diluted with water and then used. Preferably, however, the ink compositions of this invention are used with flexographic and rotogravure printing processes. As a first step in the process, the ink composition is used to print a pattern on a paper substrate. The paper substrate, itself, need not possess any unique characteristics, construction or weight, but is merely a convenient, inexpensive means for carrying and regimenting the water-based ink to its desired pattern before transfer. After the pattern has been transferred to the textile fabric, for example, the paper substrate is generally discarded.

After the desired pattern has been impressed upon the paper substrate, a textile fabric is brought into contact with the substrate, and heat and pressure are applied by means of a roller or platen plate to effect the transfer of dye from the paper substrate to the fabric. The disperse dye first sublimes and then dissolves into the fabric. Preferred fabrics are those in which the dispersed dye colorants can be solubilized. Such fabrics include polyesters, nylon or similar polyamides, acetate, cellulose triacetate, acrylics, modacrylics and combinations of such fabrics in various proportions and blends with other textile fabrics, such as cotton, wool or rayon present in amounts of 50 percent or less.

Although a number of specific embodiments have been disclosed herein, it should be understood that the present invention is in no way intended to be limited by the disclosed embodiments. Rather, it is intended that various modifications, alterations and changes can be made in the disclosed embodiments without departing from the spirit and scope of this invention as defined by the following claims.

I claim:

1. A water-dilutable, heat transfer ink composition comprising:
    A. 5–60% by weight of water as a solvent component;
    B. 1–35% by weight of at least one disperse dye capable of sublimation at temperatures in the range of about 375°F to 425°F;
    C. 5–40% by weight of a thermoplastic resin produced by reacting a polyol partially esterified rosin with a diabasic acid selected from the group consisting of maleic anhydride, fumaric acid, or a combination of maleic anhydride and fumaric acid, said resin having an acid number between about 75 and 300 and a melting pont between about 90°C and 190°C;
    D. 1–10% by weight of a water or alkali-soluble polymer selected from the group consisting of methyl cellulose, sodium carboxymethyl cellulose, carboxymethyl cellulose, carboxymethylhydroxyethyl cellulose and hydroxypropyl cellulose; and
    E. An amount of an alkaline component compatible with said remaining components to maintain the pH of said ink composition in the range of about 8 to 9.

2. The ink composition of claim 1 wherein said composition contains, as an additional solvent component, not more than 50% by weight of the total composition of water-miscible substance selected from the group consisting of methyl alcohol, ethyl alcohol, normal propyl alcohol, ethylene glycol, diethylene glycol mono ethyl ether, and ethylene glycol mono ethyl ether.

3. The ink composition of claim 1 wherein said composition additionally contains 1–10% by weight of a surface active agent.

4. The ink composition of claim 1 wherein said alkaline component comprises ammonium hydroxide or at least one organic amine.

5. In a water-dilutable ink composition suitable for use in a heat transfer printing process and including a thermoplastic resin produced by reacting a polyol partially esterified rosin with a diabasic acid selected from the group consisting of maleic anhydride, fumaric acid, or combination of maleic anhydride, and fumaric acid, said resin having an acid number between about 75 and 300 and a melting pont between about 90°C and 190°C; a water or alkaliwater soluble polymer selected from the group consisting of methyl cellulose, sodium carboxymethyl cellulose, carboxymethyl cellulose, carboxymethylhydroxyethyl cellulose and hydroxypropyl cellulose, a surface active agent; an organic amine and ammonium hydroxide; the improvement comprising, said composition also including:
    A. 5–60% by weight of water as a solvent component and 0–50% by weight of a water-miscible solvent selected from the group consisting of methyl alcohol, ethyl alcohol, isopropyl alcohol, normal propyl alcohol, ethylene glycol, ethylene glycol mono acetate and ethylene glycol mono ethyl ether, and
    B. 1–35% by weight of at least one disperse dye capable of sublimation upon the application of heat, and of transfer into and solubilization within a textile fabric.

6. The ink composition of claim 5 wherein water is present in an amount between 45 and 55% by weight, and said water-miscible solvent is present in an amount up to 10% by weight.

* * * * *